Feb. 8, 1966     J. J. LEFCOSKI     3,233,614
AUTOMATIC HAIR CUTTING APPARATUS
Filed March 22, 1963     8 Sheets-Sheet 1

INVENTOR.
JOSEPH J. LEFCOSKI,
BY
McMorrow, Berman & Davidson
ATTORNEYS.

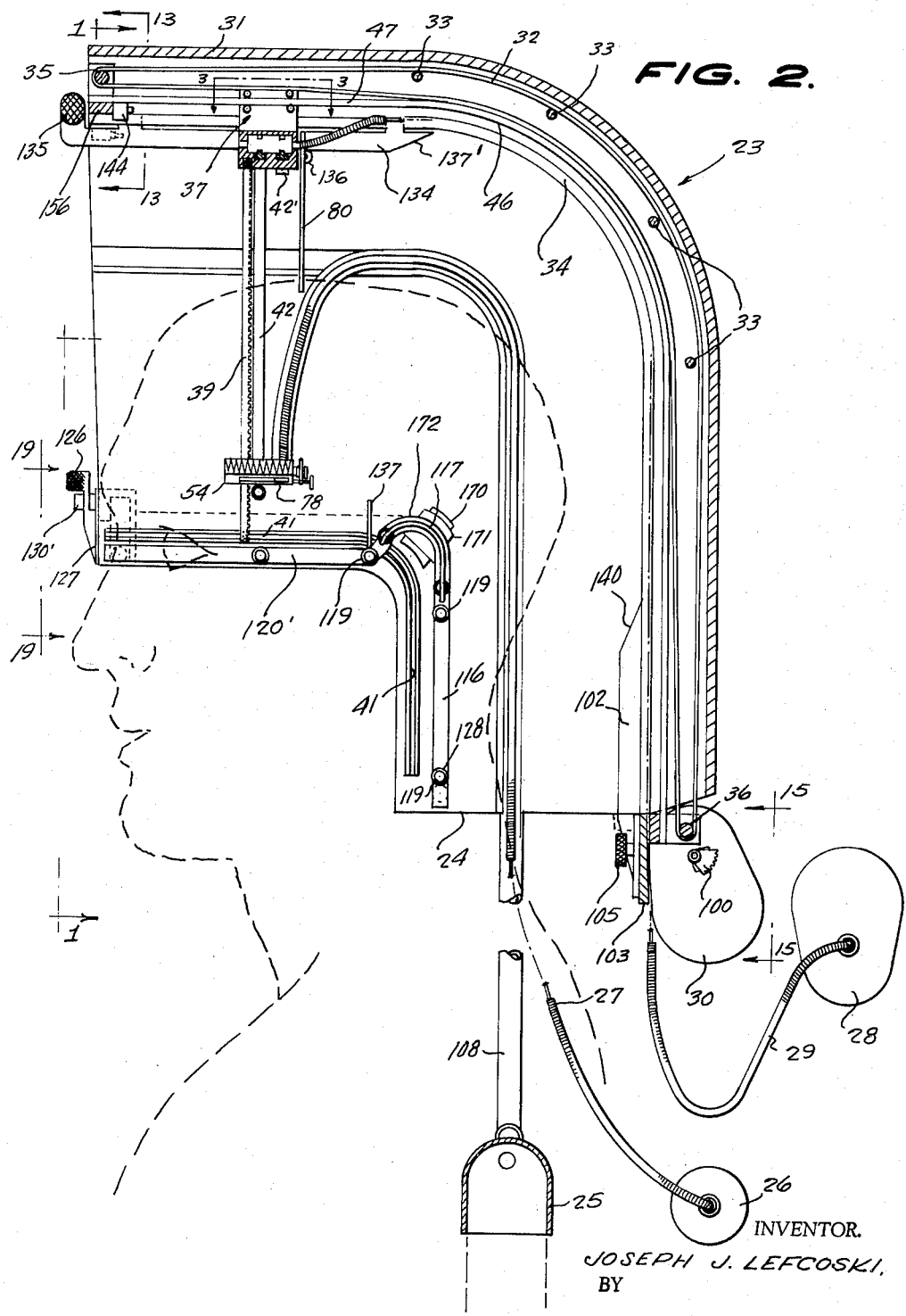

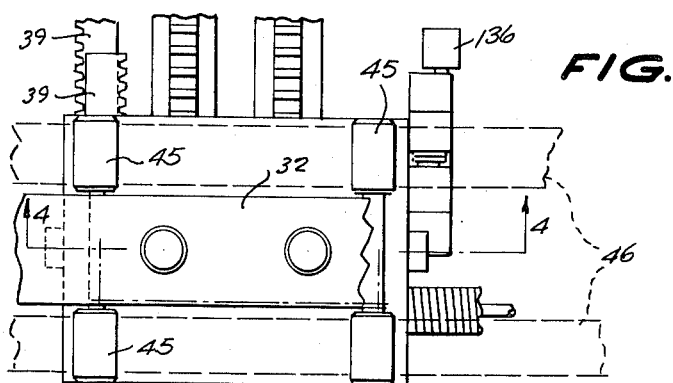
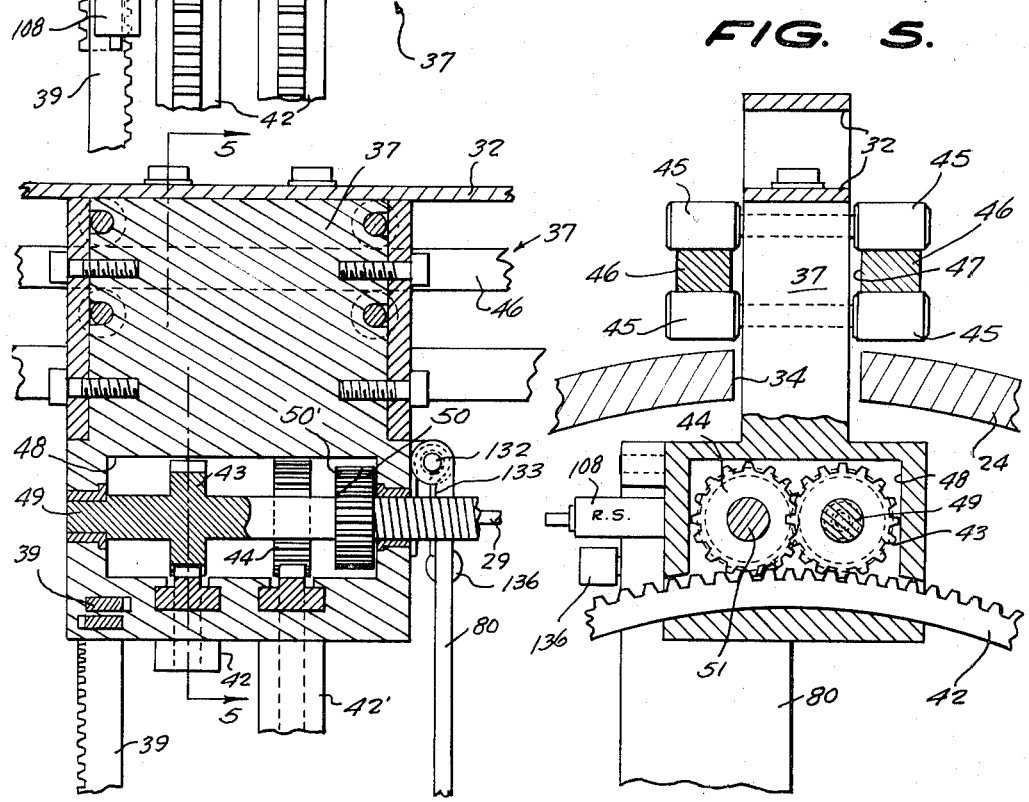

Feb. 8, 1966  J. J. LEFCOSKI  3,233,614
AUTOMATIC HAIR CUTTING APPARATUS
Filed March 22, 1963  8 Sheets-Sheet 4
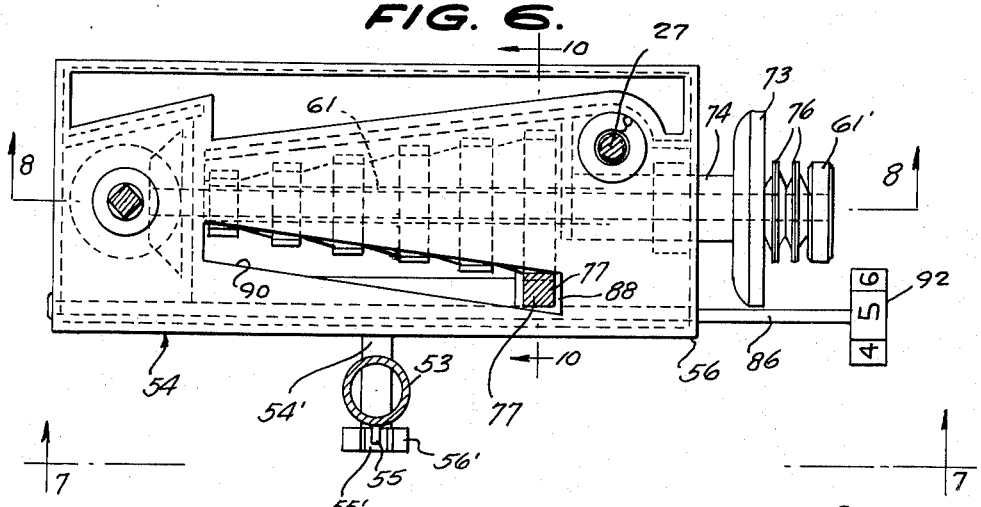
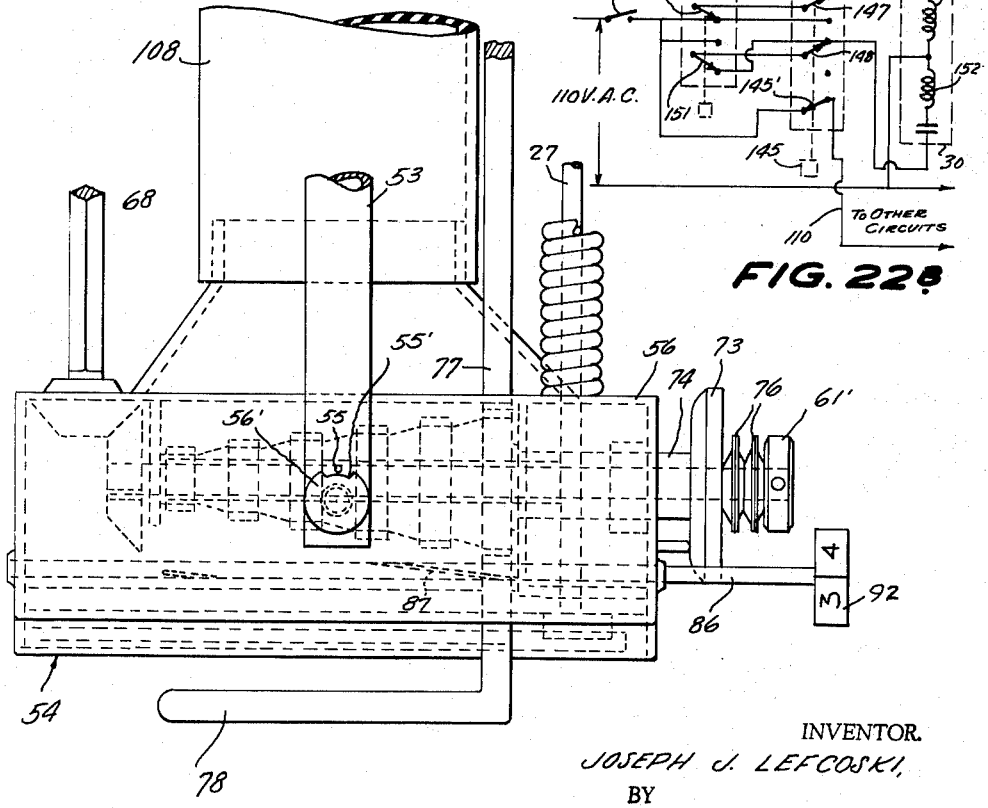
INVENTOR.
JOSEPH J. LEFCOSKI
BY
McMorrow, Berman & Davidson
ATTORNEYS.

Feb. 8, 1966          J. J. LEFCOSKI          3,233,614
AUTOMATIC HAIR CUTTING APPARATUS
Filed March 22, 1963          8 Sheets-Sheet 5
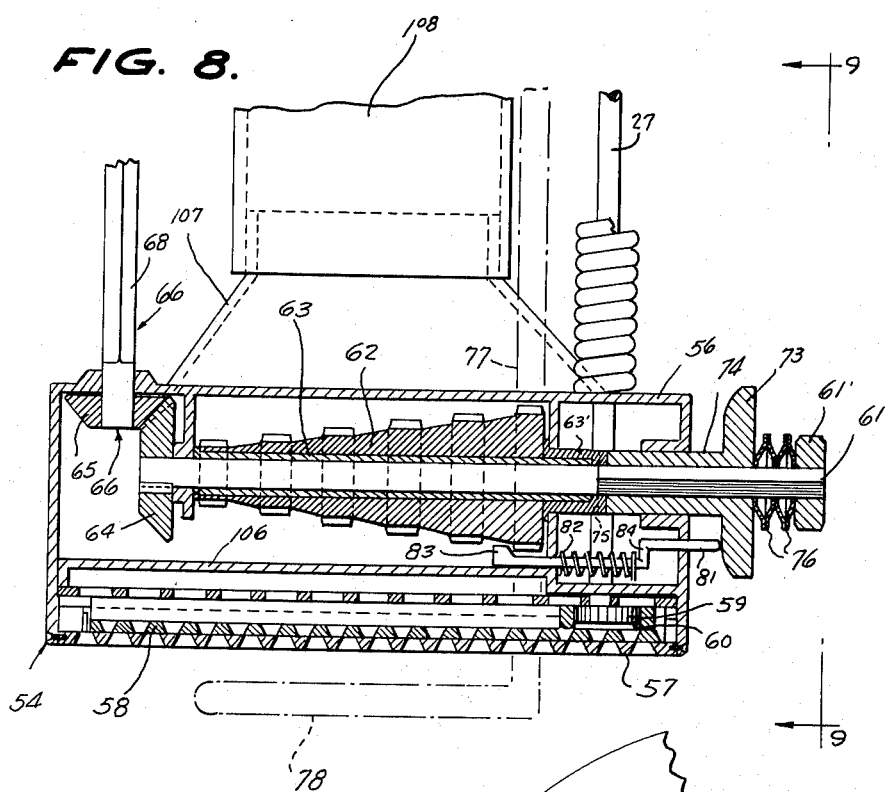
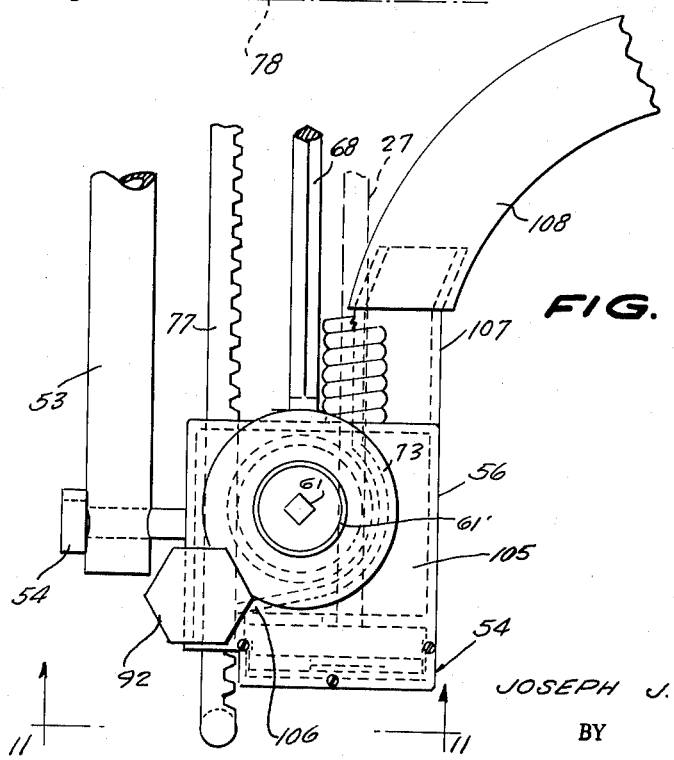
INVENTOR.
JOSEPH J. LEFCOSKI,
BY
McMorrow, Berman & Davidson
ATTORNEYS.

Feb. 8, 1966  J. J. LEFCOSKI  3,233,614
AUTOMATIC HAIR CUTTING APPARATUS
Filed March 22, 1963
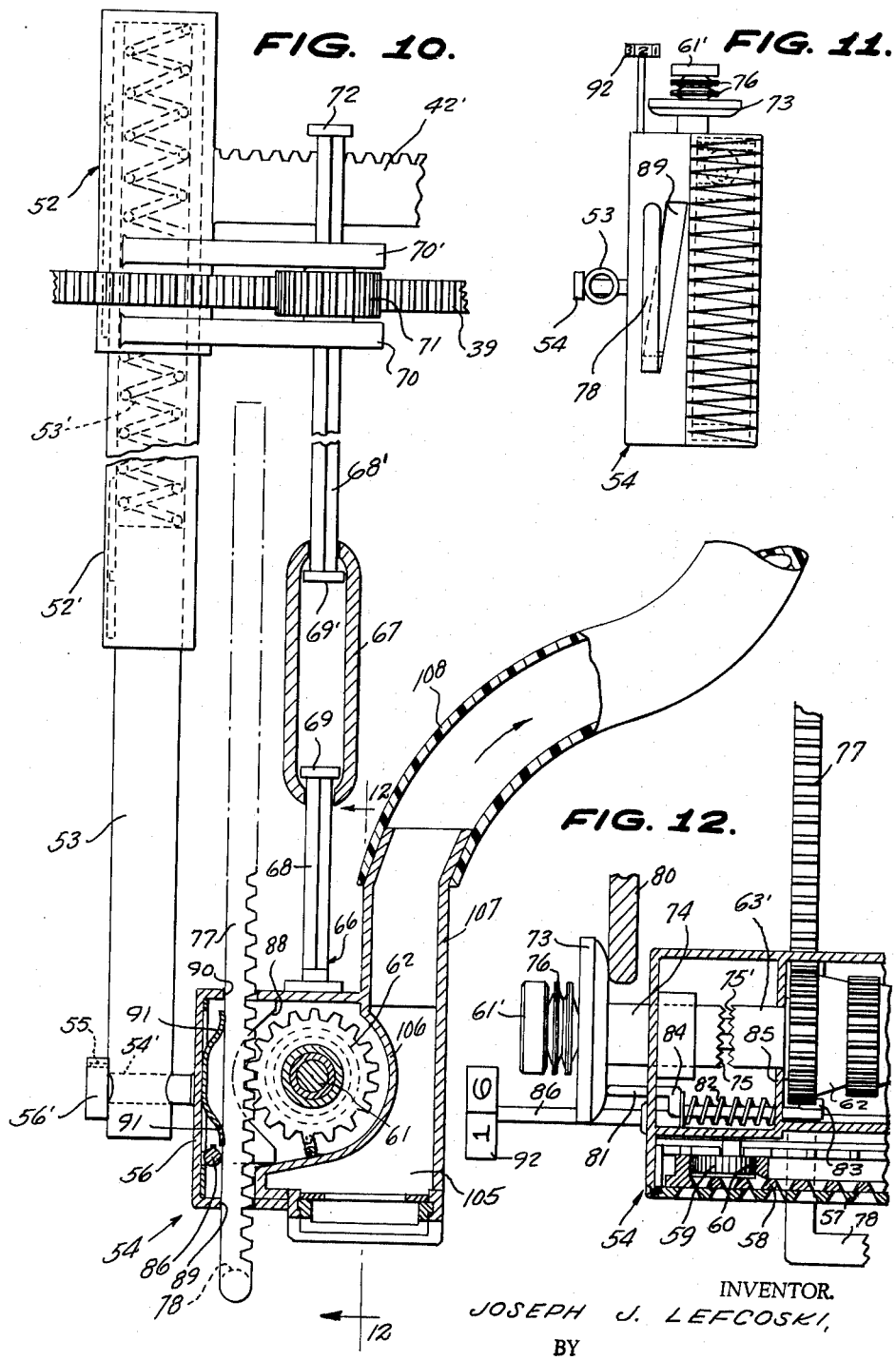
INVENTOR.
JOSEPH J. LEFCOSKI,
BY
McMorrow, Berman & Davidson
ATTORNEYS.

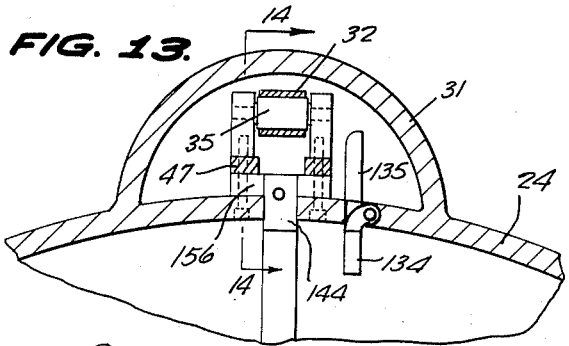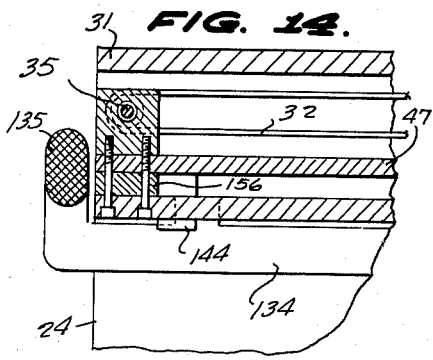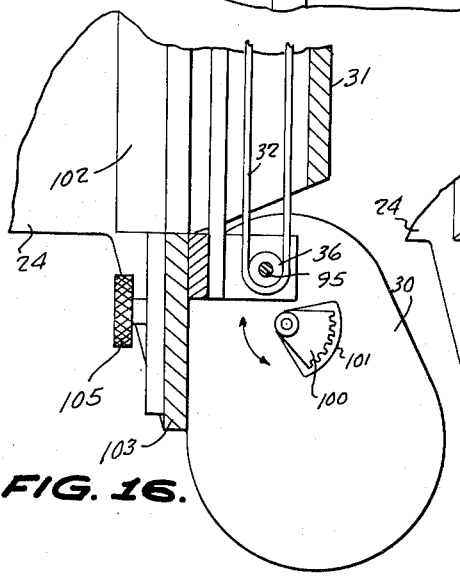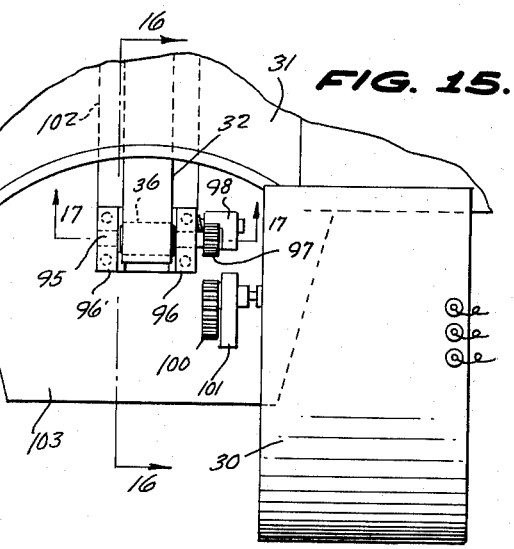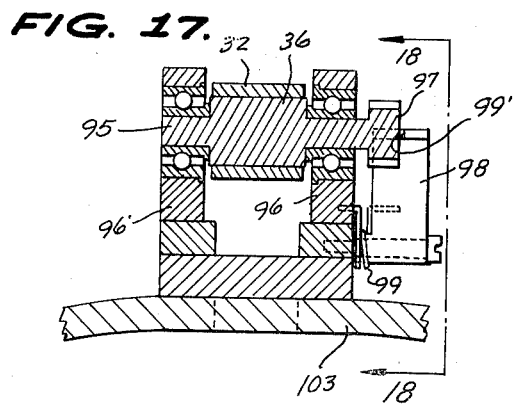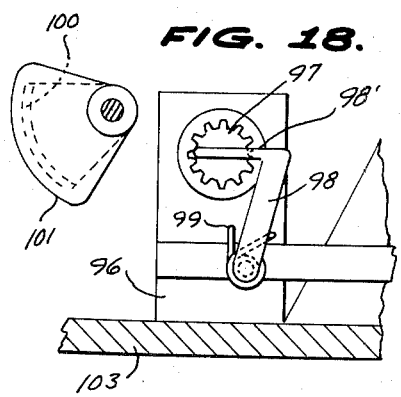
INVENTOR.
JOSEPH J. LEFCOSKI,
BY
McMorrow, Berman & Davidson
ATTORNEYS.

Feb. 8, 1966 J. J. LEFCOSKI 3,233,614
AUTOMATIC HAIR CUTTING APPARATUS
Filed March 22, 1963 8 Sheets-Sheet 8
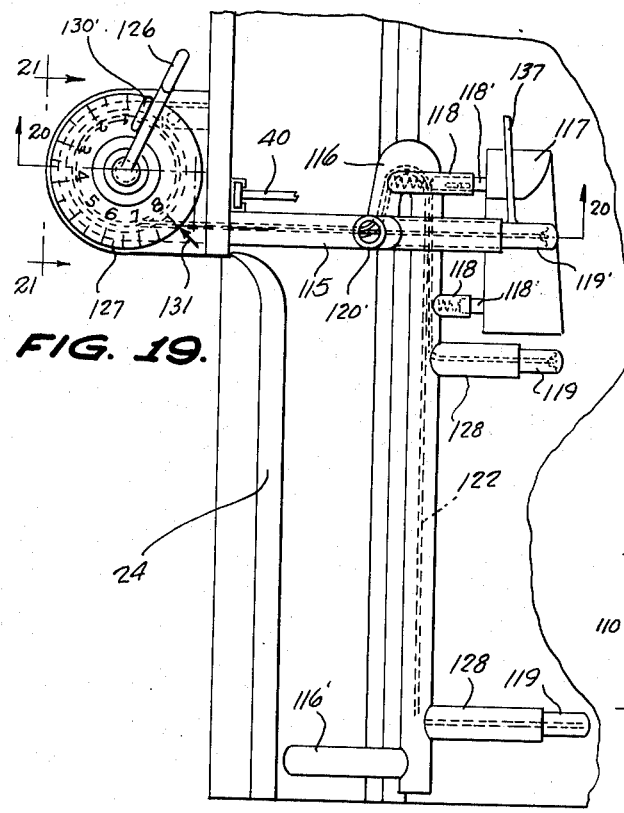
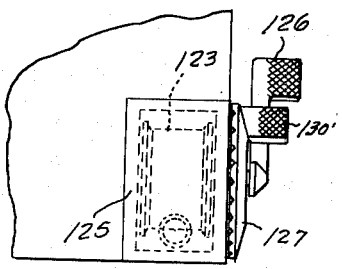
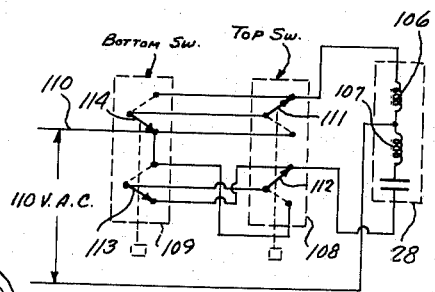
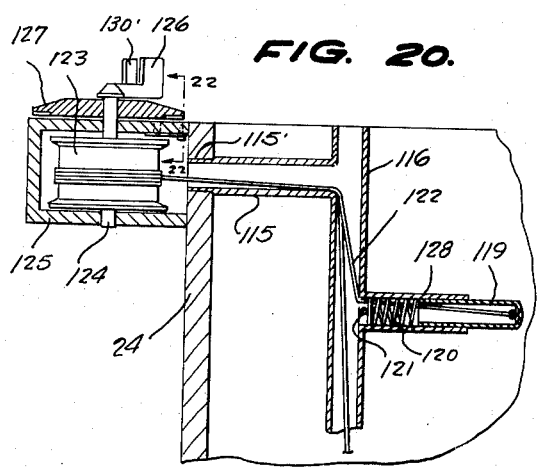
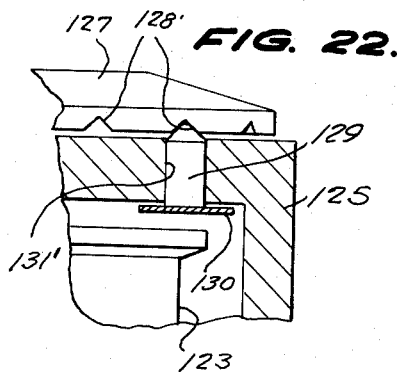
INVENTOR.
JOSEPH J. LEFCOSKI,
BY
McMorrow, Berman & Davidson
ATTORNEYS.

United States Patent Office 3,233,614
Patented Feb. 8, 1966

3,233,614
AUTOMATIC HAIR CUTTING APPARATUS
Joseph J. Lefcoski, 516 N. Decker Court, Scranton 4, Pa.
Filed Mar. 22, 1963, Ser. No. 267,307
13 Claims. (Cl. 132—45)

This invention relates to hair cutting apparatus, and more particularly to an automatic hair cutting device adapted to receive an individual's head and arranged to give the individual a haircut rapidly and efficiently.

A main object of the invention is to provide a novel and improved automatic means to perform a complete hair cutting operation in a minimum amount of time, said means being easy to adjust and control, and being smooth, quiet and effective in its operation.

A further object of the invention is to provide an improved automatic hair cutting device which is simple in construction, which is durable, and which is compact in size, the device being relatively easy and inexpensive to manufacture, and providing a great saving in barbering costs for the user.

A still further object of the invention is to provide an improved automatic hair cutting device which will effectively dispose of all hair clippings, leaving the user completely free of such clippings.

A still further object of the invention is to provide an improved automatic hair cutting device which is adaptable to a wide range of head sizes and shapes, and which compensates for any irregularities in head shape without the need of special and expensive adjustments.

A still further object of the invention is to provide an improved automatic hair cutting device which will cut an individual's hair in any of a variety of shapes and styles, the device being provided with means for automatically tapering the closeness of the cut in appropriate areas, the tapering means being readily adjustable to provide various degrees of taper.

A still further object of the invention is to provide an improved automatic hair cutting device which will effectively adjust its range and depth of cut for the areas in the vicinity of the user's ears without requiring any manual adjustment or control of the device during its operation, the device being provided with protective means whereby the user's ears will be guarded from injury and will be protected from discomfort.

A still further object of the invention is to provide an improved automatic hair cutting device which may be adjusted to cut the hair at the sides and back of the head with a gradual taper, while keeping the hair at the top of the head at a substantial uniform length.

A still further object of the invention is to provide an improved automatic hair cutting device which can be left adjusted to an individual's personal head shape and hair style and which can be used repeatedly with one set of adjustments to insure an identical haircut with each use.

A still further object of the invention is to provide an improved automatic hair cutting device which requires no adjustments after it is started, the device having means whereby it will turn itself off when the hair cutting operation is completed.

Further objects and advantages of the invention will become apparent from the following description and claims, and from the accompanying drawings, wherein:

FIGURE 2 is a vertical cross sectional view taken substantially on the line 2—2 of FIGURE 1, and showing the position of a user's head during operation of the device.

FIGURE 3 is an enlarged fragmentary horizontal plan view taken substantially on the line 3—3 of FIGURE 2.

FIGURE 4 is a fragmentary vertical cross sectional view taken substantially on the line 4—4 of FIGURE 3.

FIGURE 5 is a fragmentary vertical cross sectional view taken substantially on the line 5—5 of FIGURE 4.

FIGURE 6 is an enlarged vertical cross sectional view taken substantially on the line 6—6 of FIGURE 1.

FIGURE 7 is an enlarged elevational view of one of the tapering and clipping mechanisms employed in the device of FIGURES 1 and 2, said view being taken substantially on the line 7—7 of FIGURE 6.

FIGURE 8 is a fragmentary horizontal cross sectional view taken substantially on the line 8—8 of FIGURE 6.

FIGURE 9 is a fragmentary elevational view taken substantially on the line 9—9 of FIGURE 8.

FIGURE 10 is a cross sectional view taken substantially on the line 10—10 of FIGURE 6.

FIGURE 11 is an elevational view, to a somewhat reduced scale, taken substantially on the line 11—11 of FIGURE 9.

FIGURE 12 is a fragmentary cross sectional view taken substantially on the line 12—12 of FIGURE 10.

FIGURE 13 is an enlarged fragmentary vertical cross sectional view taken substantially on the line 13—13 of FIGURE 2.

FIGURE 14 is a fragmentary vertical cross sectional view taken substantially on the line 14—14 of FIGURE 13.

FIGURE 15 is an enlarged elevational view of the stepping mechanism of the device, taken substantially on the line 15—15 of FIGURE 2.

FIGURE 16 is a fragmentary vertical cross sectional view taken substantially on the line 16—16 of FIGURE 15.

FIGURE 17 is an enlarged fragmentary horizontal cross sectional view taken substantially on the line 17—17 of FIGURE 15.

FIGURE 18 is a fragmentary elevational view taken substantially on the line 18—18 of FIGURE 17.

FIGURE 19 is an enlarged fragmentary elevational view, showing one of the ear protective assemblies of the device, said view being taken substantially on the line 19—19 of FIGURE 2.

FIGURE 20 is a framentary horizontal cross sectional view taken substantially on the line 20—20 of FIGURE 19.

FIGURE 21 is a fragmentary elevational view taken substantially on the line 21—21 of FIGURE 19.

FIGURE 22 is a fragmentary enlarged cross sectional view taken substantially on the line 22—22 of FIGURE 20.

FIGURE 22a is a circuit diagram showing electrical connections of a typical reversing circuit for the rack drive motor employed in the automatic hair cutting apparatus of FIGURES 1 and 2.

FIGURE 22b is a wiring diagram showing a typical reversing circuit for the belt drive motor employed in the automatic hair cutting apparatus of FIGURES 1 and 2.

Figure 1:
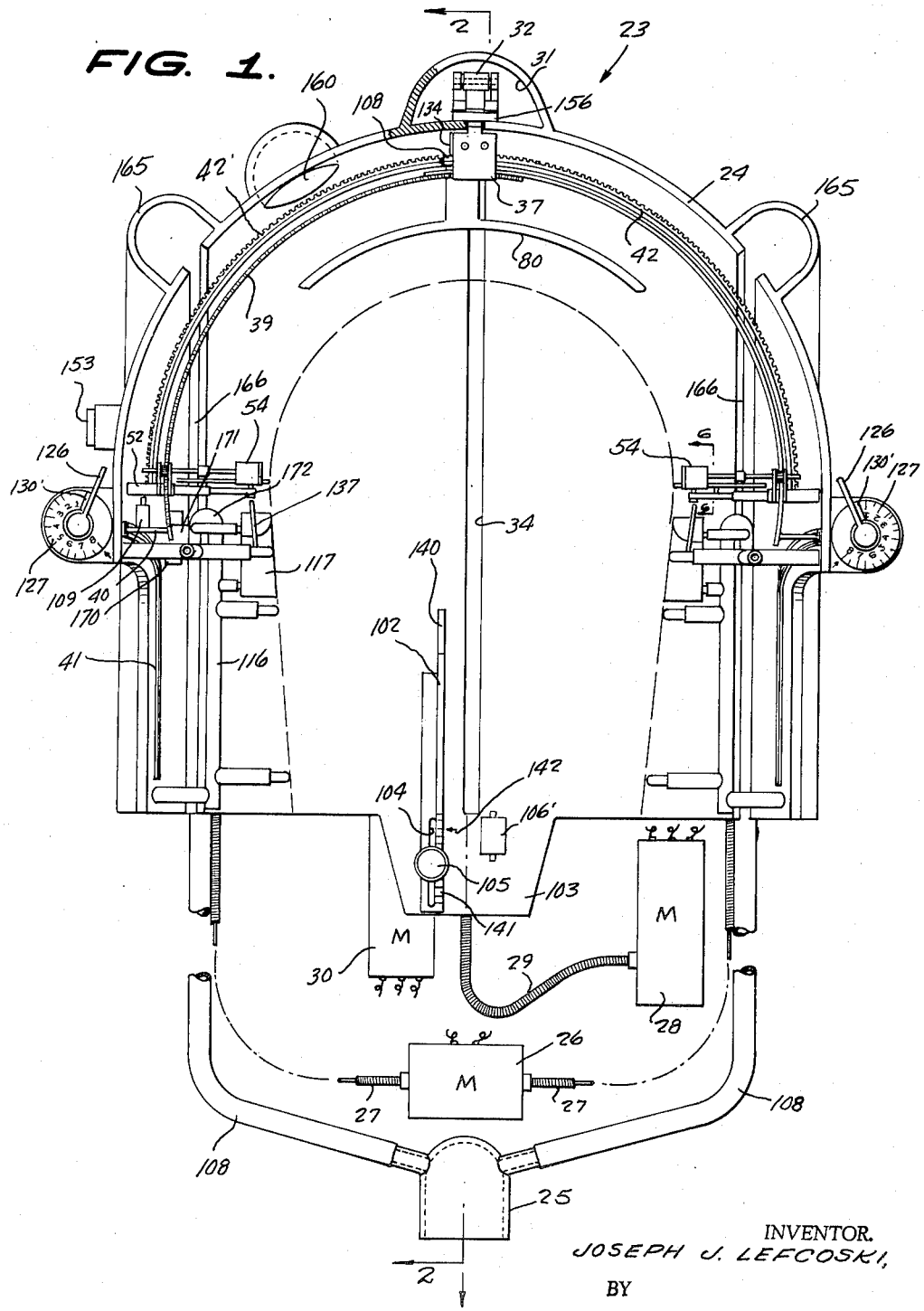
FIGURE 1 is a vertical cross sectional view taken through an automatic hair cutting device constructed in accordance with the present invention, said view being taken substantially on the line 1—1 of FIGURE 2.

Referring to the drawings, and more particularly to FIGURES 1 and 2, 23 generally designates an improved automatic hair cutting device constructed according to the present invention. Most of the working elements of the device are mounted within a hood-like enclosure 24 which fits over a person's head in the manner of a helmet. The helmet 24 is of sufficient size to accommodate a wide range of head sizes, and is adapted to be positioned over the head in the manner illustrated in FIGURES 1 and 2. Located externally of the helmet 24 are three motors 26, 28 and 30, which are mounted on suitable support means, not shown, and a similarly mounted standard exhaust fitting 25 adapted to be connected to a suitable source of vacuum, such as a standard vacuum cleaning unit.

Motor 26 is connected by flexible shafts 27, 27 to the cutters within the helmet 24, as will be presently described. Motor 28 drives the cutter racks within the helmet, in a manner presently to be described, by a flexible shaft 29. Motor 30 operates the cutter stepping or advancing mechanism.

As previously mentioned, the motors may be suitably supported outside of the helmet 24. Thus, the helmet may be mounted on a chair or on a movable stand and the motors 26 and 28 and exhaust fitting 25 may be mounted on a suitable supporting panel secured to the chair or stand, whereas motor 30 may be fastened to the rear of the helmet 24 in the position illustrated in FIGURE 2. The functions performed by the motors 26, 28 and 30, and by the exhaust fitting 25, will be described in further detail presently.

A hollow rib 31 is integrally formed on the exterior surface of the helmet 24, said rib extending substantially in the longitudinal vertical central plane of the helmet from the front and top thereof down to the bottom and rear of the helmet. Contained within the hollow rib 31 is an endless flexible belt 32, which is substantially coextensive with the rib, whose top run is supported and guided by a series of transversely arranged pulleys 33 located in the rib, and particularly arranged in the curved portion thereof, as shown in FIGURE 2, to support and guide the top run of the belt around the arcuately curved junction between the horizontal and vertical portions of the rib. The bottom run of the belt is supported by the top surfaces of a pair of parallel track bars 46, 46 mounted in hollow rib 31 and arranged above and on opposite sides of a slot 34 which extends for the length of the rib 31. The belt 32 is substantially wider than the slot 47 defined between the track bars 46, 46. The forward end of belt 32 is supported by a pulley 35 transversely journaled in the front end portion of the hollow rib 31. The rear end of the belt 32 is supported by a pulley 36 transversely journaled adjacent the bottom and rear end of the hollow rib, and mounted in a manner presently to be described.

Secured to the bottom run of the belt 32 is a carriage generally designated at 37, in the form of a block. The carriage 37 is movably supported on the track bars 46, 46 and retained thereon by respective pairs of rollers 45, 45 extending from opposite sides of the top portion of the block and engaging above and below the track bars 46, 46 in the manner clearly shown in FIGURES 3 and 5, providing smooth movement of the carriage along the track bars.

Two pairs of arcuate rack bars slightly longer than 90° in arcuate length extend slidably through the bottom forward portion of the block 37 and are arranged symmetrically on opposite sides of the block. These rack bars are designated at 39, 39. The upper ends of the rack bars 39, 39 are slidably supported in the lower forward portion of the carriage block 37, and the lower ends of the rack bars 39, 39 are supported by arms 40 which have enlarged heads suitably formed to be slidably engaged in respective channeled tracks 41 provided on the inside surfaces of the side walls of the helmet adjacent the substantially right angled bottom edge portions of said side walls. As shown in FIGURE 2, the channeled tracks 41 have horizontal forward portions and vertical rear portions, connected by arcuate corner portions.

A second pair of rack bars, generally designated at 42, 42', extend slidably through the bottom portion of the block 37 and meshingly engage with respective gears 43 and 44 provided in a cavity 48 formed in the block 37, as shown in FIGURE 4.

Gear 43 is rigidly secured on a shaft 49, for example, is formed integrally on the shaft, as shown in FIGURE 4, said shaft being journaled in the block 37. The shaft 49 is drivingly connected to the flexible shaft 29, which extends from the motor 28.

Shaft 49 is provided with another gear 50 which meshingly engages a similar gear 50' mounted on a second shaft 51 which is also journaled in the block 37, parallel to the shaft 49. The gear 44, which meshingly engages with the rack bar 42', is mounted on the shaft 51. As motor 28 drives shaft 49, gears 43 and 44 rotate in opposite directions, causing the respective rack bars 42 and 42' to be driven simultaneously through the block 37, also in opposite directions.

As shown in detail in FIGURE 10, each of the rack bars 42 and 42' has fastened to one end thereof a generally tubular support 52 containing telescoping tubular sections 52' and 53, the intermediate section 52' slidably engaging inside the tubular support 52 and the innermost section 53 slidably engaging inside the intermediate tubular section 52 and being urged outwardly by a coiled spring 53' located within section 52' and bearing between the end wall of hollow support 52 and the inner end of section 53. A cutter assembly, generally designated at 54, is fastened to the innermost section 53 by a bolt 54' rigidly secured to the cutter housing 56 and extending transversely and rotatably through the end of the tubular section 53, being limited in its rotation with respect to said tubular section by a stop pin 55 extending into a notch 55' formed in the periphery of the head 56' of bolt 54'.

Referring to FIGURES 6 to 9, the working elements of the cutter assembly 54 are contained within the housing 56. The cutter itself comprises a stationary outer blade 57 with transversely extending cutting edges arranged in a series of closely spaced open slots, and a slidable blade 58 provided with similar cutting edges which are smoothly slidable over the cutting edges of the stationary blade 57 to provide a shearing action. Blade 58 is caused to oscillate by the rotation of an eccentrically mounted circular disc 59 which is rotatably disposed in a circular aperture 60 provided in one end portion of the blade 58. The disc 59 is eccentrically connected to and is driven by the flexible shaft 27, which is in turn driven by the motor 26. Motor 26 operates continuously during the operation of the device.

Journaled longitudinally in the cutter housing 56 is a shaft 61 on which is rotatably mounted a sleeve 63 on which is secured a cone gear assembly 62 comprising a series of successive gears of progressively increasing size. A bevel gear 64 is secured to one end of shaft 61 within the housing 56. Bevel gear 64 meshingly engages a second bevel gear 65 which is secured to a drive shaft 66 which is journaled in a wall of housing 56 at right angles to the shaft 61. As shown in FIGURE 10, drive shaft 66 is of a telescoping construction, and includes a sleeve 67 provided with square holes at each end, through which slidably and non-rotatably extend respective square sections 68 and 68' of the shaft assembly 66. Within the sleeve member 67 the shaft sections 68, 68' are each provided with a round head, said heads being shown at 69, 69', the heads being enlarged to prevent the respective shaft sections from disengaging from the sleeve 67. As will be apparent from FIGURE 10, the shaft sections 68 and 68′ are axially aligned and can move along their axis relative to the sleeve 67.

Shaft section 68′ is slidably and rotatably supported in a pair of spaced parallel bearing support arms 70, 70′ formed integrally with and projecting from the support member 52. As shown in FIGURE 10, the shaft section 68′ projects beyond the bearing support arms 70, 70′ and is provided at its end with an enlarged stop head 72. A gear 71 is slidably but nonrotatably mounted on shaft section 68′ between the two parallel arms 70, 70′, said gear 71 being in meshing engagement with one arcuate rack bar 39, which passes between the two parallel support arms 70, 70′.

During operation of the apparatus, the arcuate rack bars 39 have no substantial circumferential movement, whereas the other arcuate rack bars 42, 42′ are driven circumferentially from the carriage 37. Each telescoping support 52 moves with its associated arcuate rack bar 42 or 42′, causing its associated gear 71 to be rotated by its rolling movement along its cooperating arcuate rack bar 39, thereby driving its associated shaft assembly 66 and consequently driving the shaft 61 in the associated cutter housing 56.

Each shaft 61 extends longitudinally through its associated cutter housing 56 and through an end wall of the housing, the outer end of the shaft 61 having secured thereon an enlarged head 61′. A sleeve-like hub member 74 is slidably and non-rotatably mounted on shaft 61, for example, being longitudinally splined to said shaft, the sleeve-like hub member 74 being journaled in the end wall of the housing 56 and being provided at its outer end with an enlarged annular flange 73. At its inner end the sleeve-like hub member 74 is formed with clutch teeth 75 (see FIGURE 12) which are interengageable with similar clutch teeth 75′ formed on the end of a sleeve-like member 63′ secured on the elongated main cone gear-supporting sleeve 63. The cooperating clutch teeth 75, 75′ are urged toward interlocking engagement by the action of a multiple diaphragm spring unit 76 which surrounds the outer portion of shaft 61 and which bears between head 61′ and flange 73.

A relatively slender straight rack bar 77 extends transversely and horizontally through the cutter housing 56, meshingly engaging a selected gear element of the cone gear assembly 62. The straight rack bar 77 is slidably supported in the cutter housing 56, and in use of the apparatus, said rack bar extends inwardly toward the head of the user, where it terminates in a feeler section 78 extending at right angles thereto and adapted to continuously engage the user's head adjacent to the cutting blade assembly, thereby acting as a cutting length regulator means by keeping the cutting blade assembly a given distance from the user's head. The feeler element 78, along with the entire cutter assembly, is urged toward the user's head by the expanding action of a coiled spring 53′ which is mounted within the telescoping support member 52, as illustrated in FIGURE 10.

When the shaft assembly 66 drives the shaft 61, and drives the cone gear assembly 62 through the sleeve member 74 and the clutch teeth 75, 75′, the rack bar 77 is moved transversely of the housing by the selected cone gear element with which it is meshed, forcing the cutter blades 57, 58 away from or allowing them to move closer to the user's head, depending upon the direction of rotation of the shaft assembly 66. Thus, as the cutter assembly moves upwardly from the side of the user's head towards the top thereof, the hair is cut progressively longer. Conversely, when the assembly reverses direction and moves downwardly from the top of the head to the side, the hair is cut progressively shorter.

Each cutter assembly also includes means for suspending the above-described tapering action when the hair at a selected area of the user's head is being cut. As shown in FIGURES 1, 2 and 4, an arcuate clutch disengaging bar 80 is hinged to the rear of the carriage block 37. As shown in FIGURE 12, when an arcuate rack bar 42 or 42′ brings its associated cutter assembly adjacent to the top of the user's head, the end of the clutch disengaging bar 80 engages the flange 73, causing the flange and its associated sleeve-like hub member 74 to be retracted, disengaging the clutch teeth 75, 75′. The cone gear assembly 62, being thus disconnected from its driving source, is prevented from rotating further by a stop pin 81 which is mounted for longitudinal sliding movement in the cutter housing 56, in the manner shown in FIGURE 12, and which is provided with a locking lug element 83 movable into locking engagement between the teeth of the end gear element of the cone gear assembly 62. Pin 81 is urged toward locking engagement with the end gear element of the cone gear assembly by a coiled spring 82 mounted on the pin and bearing between an offset 84 formed in the pin and the transverse bracket wall 85 in which the pin is slidably mounted. The pin 81 normally engages flange 73, said flange acting to hold the pin in an inwardly moved position where the lug 83 is disengaged from the end gear element of the cone gear assembly 62, namely, in the position illustrated in FIGURE 8. When flange 73 is engaged by the end of the bar 80, as above described, disengaging the clutch segments 75, 75′, the pin 81 is released sufficiently to allow lug 83 to engage between the teeth of the end gear element of the cone gear assembly 62, thus locking the cone gear assembly against rotation.

The degree of taper of the hair cutting action can be adjusted by selectively engaging the rack bar 77 with hte various gear elements of the cone gear assembly 62. As shown in FIGURES 6 and 7, an adjusting shaft 86 is provided, said shaft 86 being journaled in the cutter housing 56 parallel to the shaft 61. Shaft 86 is provided with a helical rib or spline 87. The shaft 86 is threadedly engaged, by means of the helical spline 87, through the side walls of a channel-shaped sleeve 88, said side walls having substantially key-hole shaped apertures to receive the shaft 86 with its spline rib 87. The sleeve 88 is slidably disposed transversely in the bottom of cutter housing 56 with its ends slidably engaging the front and rear walls of the housing, whereby said sleeve may be moved longitudinally of the housing responsive to rotation of shaft 86. The rack bar 77 extends slidably through parallel inclined slots 89 and 90 in the front and rear walls of housing 56 and is received in the channel-shaped sleeve 88, being substantially in sliding contact with the inside surfaces of the side walls of said sleeve. The rack bar 77 is urged inwardly toward the cone gear assembly 62 by inwardly struck resilient fingers 91, 91 formed on hte bottom wall of sleeve 88, as shown in FIGURE 10, whereby the rack bar 77 is urged into meshing engagement with a selected gear element of the cone gear assembly.

Shaft 86 is provided with a hexagonal adjusting knob 92 whose flat edge surfaces are inscribed with numbers corresponding to the various gear elements of the cone gear assembly, so that the different meshed positions of rack bar 77 will be indicated in accordance with the different rotated positions of the adjusting knob. The pitch of the helical spline rib 87 is such that by rotating knob 92 through an angle of 60°, rack bar 77 will be moved from meshing engagement with one gear element into meshing engagement with the next successive gear element of the cone gear assembly. This changes the degree of taper produced by the action of the rack bar in accordance with the change in size of the cone gear elements.

As the cutter shears hair into the housing 56, the cut hair fragments pass through a passage 105 separated from the cone gear assembly by a partition wall 106. From passage 105 the cut hair fragments pass through a conduit fitting 107 and into a flexible conduit 108 attached thereto, the conduit 108 leading to the fitting 25 at the base portion of the device. As previously mentioned, the fitting 25 is adapted to be connected to the intake hose of a standard vacuum cleaning unit. Thus, the severed hair fragments are collected by the vacuum cleaning unit connected to the standard conventional fitting 25.

During operation, the carriage block 37 is moved along the slot 34 by the carriage advancement system shown in detail in FIGURES 13 to 18. The block 37 moves with the bottom run of the endless belt 32, said endless belt being driven by the pulley 36. As shown in FIGURE 17, the pulley 36 may be formed integrally on a shaft 95 which is journaled in respective parallel supports 96, 96' secured on and extending from the bottom end portion 103 of the rear wall of helmet 24. Shaft 95 projects outwardly from one of the supports 96 and is provided on its end with a gear 97. A locking dog 98 is pivoted to the base portion of support 96 and is urged toward locking engagement with the teeth of gear 97 by a coiled spring 99 having one end anchored to the support 96 and having the other end formed to extend transversely of and to bear against the dog 98 and to urge the dog in a counterclockwise direction, as viewed in FIGURE 18, namely, toward locking engagement with the gear 97.

As shown in FIGURES 17 and 18, the dog 98 is provided with an arm 98' which is notched at 99' to receive the gear 97, the notch 99' having an edge portion extending parallel to the axis of rotation of the dog 98 and being lockingly engageable between a pair of adjacent teeth of the gear 97 under the biasing force of the spring 99. Motor 30 is mounted externally of the bottom portion 103 of the rear wall of helmet 24 with its shaft extending parallel to shaft 95. Mounted on the shaft of motor 30 is a sector gear 100 which is meshingly engageable periodically with gear 97 as the motor shaft rotates. Sector gear 100 is provided with a flange 101 projecting adjacent the sector gear and located to engage the dog 98 and push it back from the gear 97, whereby to release said gear, immediately before the sector gear 100 meshingly engages with the gear 97, thus allowing said gear 97 to be driven by the sector gear during the period of meshing engagement of the sector gear with the gear 97. At the end of said period of engagement the sector gear 100 rotates away from the gear 97 and the flange 101 disengages from dog 98, releasing the dog and allowing said dog to again lockingly engage the gear 97. Thus, the motor 30 intermittently drives the gear 97, and correspondingly moves belt 32 and the carriage 37 attached thereto.

Designated at 102 is a vertical angle bar which is adjustably mounted on the depending rear wall portion 103 of the helmet 24, said angle bar having a vertical slot 104 through which extends a clamping screw 105 threadedly engaged in wall portion 103.

Mounted on wall portion 103 is a stop switch 106', the operating element of said switch being located in a position to be engaged by the carriage block 37 at the bottom limit of travel of said block along slot 34.

Rack drive motor 28 is of the reversible type, comprising, for example, the respective windings 106 and 107 shown schematically in FIGURE 22a. Said motor is connected in an energizing circuit including respective upper and lower conventional plunger-operated reversing switches 108 and 109, which may be of the double-pole double-throw type, as shown schematically. These switches may be of a conventional type wherein each plunger actuation moves the switch poles from engagement with one set of contacts to engagement with the other set of contacts of the switches, regardless of which set of contacts the poles are initially engaging.

The upper reversing switch 108 is mounted on the block 37 in a position such that its operating plunger will be engaged by a support element 52 substantially at the upper limit of travel of the associated cutter assembly, whereas, the bottom reversing switch 109 is mounted on an arm 40 in a position such that its operating plunger will be engaged by support element 52 substantially at the lower limit of travel of the cutter assembly. As will be apparent from FIGURE 22a, when either switch 108 or 109 is actuated, one of the motor windings will become deenergized and the other motor winding will become energized in place thereof, thereby reversing the direction of rotation of the motor shaft.

The circuit of FIGURE 22a is arranged so that, assuming initial energization of winding 106, and the support 52 moving upwardly, with the switches in the position shown, switch 108 will be actuated when the supports 52 reach their top limiting positions, causing winding 106 to be disconnected from supply wire 110 at pole 111 of switch 108, and causing winding 107 to be connected to supply wire 110 at bottom pole 112 of switch 108 through the bottom pole 113 of switch 109. Similarly, upon reversal of movement of the cutter assemblies and when they reach their bottom limiting positions, switch 109 will be actuated, disconnecting winding 107 at pole 113 and connecting winding 106 to line wire 110 through upper pole 111 of switch 108 and upper pole 114 of switch 109.

FIGURES 19 to 22 show one of the ear guards and its associated members. Designated at 115 is a hollow rigid support tube which is secured in an aperture 115' in a side wall of the helmet 24 and which extends inwardly toward the area of the user's head below the temple. A secondary rigid tube 116 branches from support tube 115 and is located adjacent to the position of the user's ear, said tube 116 having a horizontal top portion 120' substantially at this level and extending downwardly therefrom a substantial distance below the level of this position. Secondary tube 116 is rigidly secured at its top and bottom portions to the side wall of the helmet 24 by rigid connecting tubes 116'. A protective shield 117 is supported by hollow posts 118, 118 extending horizontally from secondary tube 116 adjacent the junction of its horizontal and vertical portions, the shield 117 being provided with horizontal rod elements 118' which slidably engage in the horizontal supporting tubes 118, whereby the guard or shield member 117 is adjustable horizontally. Preferably the shield member 117 is biased toward the user's head by the provision of suitable biasing springs in the hollow horizontal posts 118, said springs bearing on the arms 118' and biasing them outwardly. Suitable stop means may be provided to prevent complete disengagement of the arms 118' from the hollow posts 118.

The shield member 117 is shaped to overlie and cover the user's ear and to hold the user's ear free of areas to be cut, the shield member being of sufficient width to protectively cover and shield the ear from the moving cutter.

Projecting horizontally and inwardly from the secondary tube 116 are several vertically spaced short tubes 128 which are located so as to be adjacent respective definite abutment areas on the user's head. Telescopically engaged in each tube 128 is a hollow plunger member 119, closed at its outer end, urged to an extended position by a coiled spring 120 located inside the associated tube 128 and bearing between a transverse pin 121 provided in the tube and the inner end of the hollow plunger element, as shown in FIGURE 20. The hollow plunger members 119 are connected to respective flexible cable elements 122 which extend back through secondary tube 116 and horizontal support tube 115 and are wound on a spool 123 which is mounted on a shaft 124 journaled with substantial friction in a housing 125 secured to the outside of the side wall of helmet 24. Shaft 124 is provided with an external adjusting lever 126 which may be manually rotated. Rotatably mounted on the shaft 124 between the lever 126 and the adjacent wall of housing 125 is a calibrated disc member 127 which is yieldably held against rotation by a detent pin 129 slidably engaged in an aperture 131' of the housing wall adjacent to the disc and having a tapered end engageable selectively in radial grooves 128' formed in the inside surface of the disc member 127, as is clearly shown in FIGURE 22. The pin 129 is biased toward interengagement with the recesses 128' by a leaf spring 130 which is secured to the inside surface of the housing wall and which acts on the end of the pin 129, urging it outwardly. The calibrated disc member 127 is provided with a lug 130' projecting from its outside surface and adjacent its periphery, said lug being employed for setting the dial 127 to a desired position with respect to an index pointer 131 provided on the surface of the wall of housing 125 adjacent the peripheral edge of the disc member, as shown in FIGURE 19. The lug 130' thus constitutes an adjustable stop for limiting the position of the lever 126 to a predetermined position of angular adjustment. Thus, the disc member 127 may be set to locate lug 130' at a position corresponding to the desired degree of extension of the hollow plungers 119. By rotating the lever 126 clockwise, as viewed in FIGURE 19, and by rotating the corresponding lever 126 on the opposite side of the helmet counterclockwise, the hollow plungers 119 are simultaneously retracted, allowing the helmet to receive the user's head. The levers 126 can be manually rotated in return directions until the levers engage the lugs 130', at which position they will be retained, thus holding the plunger members 119 in predetermined positions of extension, corresponding to the size and shape of the user's head, namely, corresponding to the proper amount of engaging pressure exerted by the hollow plunger members 119 on the adjacent areas of the user's head to hold the helmet in position for proper cutting action.

As will be readily apparent, the dials 127 may be easily reset by rotating same by means of the lugs 130' to positions indicated by the pointers 131 with respect to the numerals on the peripheral portions of the dials.

As will be readily apparent, when the lever 126 is rotated clockwise, as viewed in FIGURE 19, the flexible cable elements 122 are wound up on the spool 123, and the springs 120 are compressed. When the lever 126 is released, the springs 120 exert force on the plunger elements 119, which in turn exert tension on the flexible cables 122, causing the spool 123 to rotate in a direction to unwind the flexible cables, the rotation being terminated when lever 126 engages the lug 130'.

Since the junction 172 of rigid tubes 116 and 120' is upwardly offset away from parallelism with the arcuately curved junction between the horizontal and vertical positions of channel 41, as shown in FIGURE 2, the support 52 cannot directly engage the operating element of the reversing switch 109 in this area. Therefore, a spring-biased force-transmitting plunger 170 is slidably and resiliently supported in a sleeve-like housing 171 secured on junction 172, the plunger being located and directed so that it is interposed between the support 52 and the switch 109 when the arm 40 is in this region so as to transmit force from support 52 to the operating element of the reversing switch.

As previously mentioned, the clutch disengaging bar 80 is hinged to the rear of the carrier block 37 by a transverse hinge connection, shown at 132 in FIGURE 4. A biasing spring 133 is provided on the hinge shaft and acts between the block 37 and the member 80 to bias the member 80 in a counterclockwise direction, as viewed in FIGURE 4, namely, in the direction whereby the member 80 is elevated to a position substantially parallel to the top wall of the helmet. In this position the clutch disengaging member 80 is inoperative, since it is not engageable with the clutch flange 73. With the clutch disengaging arm 80 in the aforesaid elevated position, the tapering action would continue all along the upper cutting area. However, if a "flat-top" type of haircut is desired, wherein the hair at the top portion of the head is cut to a substantially uniform length, it is necessary to employ the cutter disengaging member 80 in the manner previously described, namely, to cause the member 80 to descend to the position shown in the drawings, so that the tapered cutting action terminates at the upper cutting area by the disengagement of the clutch teeth 75, 75'. To cause the member 80 to be lowered, a cam bar 134 is hinged to the top wall portion of the helmet, said cam bar extending parallel to the slot 34 at the top wall of the helmet and being provided at its forward end with an externally exposed actuating arm 135 which may be employed to rotate the cam bar 134 between a first position wherein the bar 134 is disposed parallel and adjacent to the under surface of the top wall of the helmet to a second position wherein it depends substantially perpendicular from said top wall, namely, to the position shown in FIGURES 1, 2 and 13. Conventional toggle spring means may be provided to retain the cam bar 134 in either of the two above-described positions.

The member 80 is provided at its upper portion with a side-mounted roller 136 which is journaled to the side edge of the supporting stem of the member 80 in a position to engage the edge of cam bar 134 when it is adjusted to the depending position thereof illustrated in FIGURES 2 and 13. The cam bar 134 is provided with the inclined inner edge portion 137' which is initially engaged by the roller 136 as the carriage block 37 moves forwardly from the rear portion of the helmet towards the front portion thereof, causing the member 80 to be swung downwardly toward the position thereof shown in FIGURE 2, namely, towards a position wherein it is effective to engage with the flange 73 to cause clutch disengagement, as above described, whereby the tapering cutting action is discontinued and whereby uniform hair cutting length is provided. The drawings illustrate the cam bar 134 set to a position corresponding to the "crew-cut" type of haircut.

Rigidly secured to a plunger element 119' opposite each ear guard 117, as shown in FIGURE 19, is an upstanding rod-like clutch disengaging bar 137. The clutch disengaging bars 137, 137 are located to engage the flanges 73 of the respective cutter assemblies at the opposite sides of the apparatus when they reach the areas immediately adjacent to the ear protective shields 117, so as to provide uniformity of hair cutting length in this area, namely, in the areas immediately above and adjacent to the ears. It will be understood that when the cutters reach this region, the feeler elements 78 have been retracted to a considerable degree so that the cut is relatively close. Thus, a relatively close cutting action is provided in the region adjacent to the ear guard members 117, and the cutting action is held uniform as the cutting assemblies descend along the upstanding rod-like clutch disengaging bar elements 137.

The angle bar 102 is arranged to function as a cam bar, similar to the cam bar 134, so that when the member 80 approaches the lower rear portion of the helmet, the roller 136 first engages the inclined top end portion 140 of the angle bar 102, as shown in FIGURE 2, swinging the member 80 into a position to provide clutch-disengaging action, so that there is uniform length of cut adjacent the lower rear portion of the user's head and on the user's neck. Again, in this region, the cutters are supported relatively close to the user's head and neck so that the cutting action is close and should be maintained uniform, as in the case of the areas adjacent the ears. The effective position of the angle bar 102 may be regulated by means of the clamping screw 105, which holds the angle bar in a predetermined adjusted position. As shown in FIGURE 1, the face of the angle bar adjacent the clamping screw 105 is provided with a calibrated scale 141 which may be moved with reference to a fixed indicating pointer 142 on member 103, so that the proper settings of the angle bar 102 are reproducible for given individuals.

The motor 30 which drives the belt 32 may be of a reversible type, similar to the motor 28 and may be provided with a reversing circuit similar to that shown in FIGURE 22a, in connection with the rack drive motor 28. In employing this type of reversing circuit, respective reversing switches, similar to the switches 108 and 109 previously described, may be provided at the forward and rear extreme limits of travel of the carriage block 37, for engagement by said carriage block to provide the required reversal of motor 30. Thus, the switch 106' may be a multiple-pole double-throw switch, and may be connected in a double three-way reversing circuit similar to that shown in FIGURE 22a, in conjunction with a double-pole double-throw switch 144 mounted in a position so that its operating plunger may be engaged by the forward face of carriage block 37 as said block reaches the upper forward limit of its travel.

FIGURE 22b shows a preferred reversing circuit arrangement similar to that above described and involving the respective three-way reversing switches 106' and 144. In this arrangement the bottom rear reversing switch 106' is preferably of the type which may be manually operated as well as actuated by being contacted by the block 37. Thus, the switch 106' may be provided with an operating element 145 which may be manually actuated to initiate the operation of the machine, whereby to move the poles thereof into the positions illustrated in full line view in FIGURE 22b. Assuming the carriage block 37 to be at the lower rear extreme position, at the beginning of the hair cutting operation, which would be the usual case, the operating member 145 of the switch 106' would be manually actuated to move its poles 147 and 148 to the upper positions thereof illustrated in FIGURE 22b, which would energize the winding 149 of motor 30. The motor 30 would then operate in the direction to move the block 37 upwardly. Simultaneously with this action, the other motors of the device would be energized by the closure of a switch section 145' operated concurrently, so that the cutting action would begin at this time. Upon reaching the upper forward end of its travel, the block 37 engages the operating element of the switch 144, moving its poles 150 and 151 to their upper positions, deenergizing the winding 149 and energizing the reversing winding 152 of motor 30. The carriage block 37 thus reverses its direction of movement, returning towards its starting position, with the cutting action continuing. As the carriage block 37 reaches the bottom limit of its travel, it engages the operating element of the switch 106', moving its poles 147 and 148 to their lowered positions, which deenergizes the winding 152, thus terminating operation of the motor 30 and simultaneously opening switch section 145'. With the circuit shown in FIGURE 22b, it will, of course, be necessary to manually reset switch 144 to the position thereof shown, namely, with its poles in engagement with its lower contact, in order to prepare the apparatus for its next use.

A main control switch 153 may be provided for simultaneously energizing the various electrical circuits of the device, said main control switch being mounted at a convenient exposed location on a side wall of the helmet, as shown in FIGURE 1.

The motor reversing circuits of FIGURES 22a and 22b may be dispensed with if motors 28 and 30 are synchronous motors of the type in which the drive shaft of the motor reverses its direction of rotation automatically upon reaching a stop point in its path of movement, or when an element drivingly connected to said shaft reaches such a stop point. Thus, the rack drive motor 28 will reverse in direction each time the members 52 encounter positive resistance to movement, whereby the rack bars 42 and 42' will oscillate back and forth through the carriage block 37 as long as motor 28 remains energized.

The stop or reversing points provided for contact by support 52 along the marginal ends of the hairline are the secondary rigid tubes 116 and 120', as well as the arcuate junction joining them.

Similarly, motor 30 will reverse in direction when the carriage block 37 encounters positive resistance to movement at the limit of its forward travel, namely, when the carriage block encounters the transverse connecting block 156 at the forward end of slot 34. With the use of synchronous motors of this type for the motors 28 and 30, a simple electrical control circuit may be employed wherein switches 153 and 106' are respective three-way touch button switches connected in a conventional three-way circuit between the electrical components of the apparatus (wired in parallel) and the power source, for example, in the same manner in which lamp circuits are conventionally connected to a pair of supply wires through a three-way circuit employing a pair of three-way switches, each having control over the energization and deenergization of the lamp circuit. Actuation of the touch button switch 153 will set the apparatus into operation. The carriage block 37 will be moved, in the course of operation of the apparatus, from its starting position at the lower rear portion of the helmet (adjacent the back of the user's neck) to the upper front limit of travel, where it will encounter positive resistance to further movement, whereby the synchronous drive motor 30 will reverse in direction and return the carriage block to its starting position, meanwhile performing another hair cutting cycle, superimposed over that performed in the first half of the cycle of operation. Thus, during the first half of the cycle of the carriage block and subsequently during the second half of the cycle of movement of the carriage block two complete superimposed hair cutting operations are consecutively performed. When the carriage block returns to its starting position it actuates the three-way touch button switch 106', shutting off the apparatus.

The electrical components of the apparatus may include a germicidal lamp unit 160 mounted on the helmet in a position to irradiate the user's scalp during operation of the apparatus, as shown in FIGURE 1.

The flexible cables, flexible air conduits, and other flexible connecting parts are to a large extent protectively housed in a pair of integral tunnels 165, 165 provided externally at opposite side portions of the helmet 24 and communicating with the inside of the helmet through slots 166, 166 which are substantially coextensive with said tunnels and through which the flexible connecting parts extend, sufficient slack being provided to allow for the full required range of movement of the flexible connecting parts.

In operation of the automatic hair cutter, the user first selects the degree of taper he desires on the indexed polygonal knobs 92 and rotates said knobs to the positions corresponding with the desired degree of taper. The user then selects the line of taper at the back of the neck by adjusting the angle bar 102 to a position corresponding to the point at which tapering action is desired, namely, where the roller 136 is to engage the inclined edge 140, and locks the angle bar 102 in the desired position by tightening the screw 105. Then, if he wishes a "flat top" cut, he rotates the arm 135 to move the cam bar 134 to its depending position, as shown in FIGURE 2. The operator then sets the apparatus for proper head size by rotating the dials 127 by means of their lugs 130' to the required positions, as indicated by the pointers 131. The operator then fully retracts the positioning plungers 119 by rotating the levers 126 away from the lugs 130, whereupon the user inserts his head into the helmet by aligning his ears with the ear guard members 117 and positioning his ears in said ear guard members snugly but comfortably by moving his head upward and backward in a substantially single movement, thus pushing the helix portions of the ears downwardly and the concha and low portions of the ears forwardly. These parts of the ears are now completely contained in and shielded by the ear guard members 117 and the hairlines around the ears are fully exposed. The levers 126 are then returned to positions engaging the lugs 130', allowing the plungers 119 and 119' to be extended from their supporting sleeves and to snugly and firmly contact the sides of the head and neck, thus properly positioning the helmet on the head.

The user then merely starts the apparatus motors, for example, by operating the starting push button switch 153 (and the switch 106' if the circuits of FIGURES 22a and 22b are employed). The cutting cycle begins at the back of the neck through the cooperation of the various parts of the mechanism, as above described. After completing a cycle of forward operation, at the end of which the carriage block 37 reaches the top forward end of the helmet, as above described, the rack drive motor 30 reverses and the cutting operation is duplicated rearwardly as the carriage block 37 returns to its starting position, at which it operates switch 106' to terminate operation of the hair cutting apparatus. The user then rotates the levers 126 to retract the hollow plungers 119 and 119' and removes his head from the helmet. The entire operation can be accomplished in a very short time, of the order of one minute.

As above described, the cutter housings are pivotally connected to the arms 53 in a manner to allow limited pivoted action by the cooperation of the pins 55 with the notches 55'. This limited permissive pivoting allows sufficient cant for the cutter assembly housing to properly cut the hair in the areas at the back of the head which are immediately above the neck. The telescoping drive shafts 66 will bend sufficiently to permit such canting.

The feeler members 78 are of rounded configuration and provide uniformly distributed contact pressure on the surface of the head engaged thereby, resulting in a combing or setting up action of the hair, preparing it for cutting and arranging it in a favorable position to be drawn into the cutter heads by the air suction present therein.

It will be apparent, except for the use of the cam bar 134 and the special clutch-disengaging elements 137 and 102, the cut hair length will correspond precisely with the distance of travel of the carriage block 37 from its starting position, in accordance with the extent of stroke action available to rack bars 42, 42' along rack bars 39, 39 between the carriage block 37 and rigid tubes 116 and 120', or of arms 40 along channeled tracks 41 along various areas of the head, the length increasing as the carriage block is moved upwardly and forwardly in the first half of the cutting operation and correspondingly diminishing as the carriage block moves rearwardly and downwardly in the second half of the cutting operation. The tapering action is precisely symmetrical on the opposite sides of the head so that precise symmetry is achieved in the hair cutting operation.

Furthermore, precise engineering of rigid tubes 116 and the vertical legs of the channeled tracks 41 from vertical to appropriately diagonal lines to follow the natural hairline in this area, or making the rear portion of the helmet slightly diagonal inwardly, or a suitable combination of this will produce an even more precise symmetry of cut by controlling the stroke action of rack bars 42, 42'.

The clutch-disengaging members 137 act to prevent tapering action in areas located forwardly of the ears and provide for clean, substantially shaving action subjacent the "sideburn" areas of the head.

It will be understood that the reversing circuits shown in FIGURES 22a and 22b are merely typical of many other suitable motor-reversing means which may be employed, in accordance with the present invention, to effect the reversal of the belt drive motor 30 and the rack drive motor 28, including the provision of synchronous motors of the type which automaticaly reverse when encountering positive resistance, as above described.

By making the cutter head assemblies detachable and by providing an independent switch for the vacuum and rotary motions only, the device can also be employed as a face shaver.

While certain specific embodiments of an improved automatic hair cutting apparatus have been described in the above discussion, it will be understood that various other modifications of the invention within the spirit thereof may occur to those skilled in the art. Therefore, it is intended that no limitations be placed on the invention except as defined by the scope of the appended claims.

What is claimed is:

1. An automatic hair cutting apparatus comprising a helmet shaped to fit longitudinally over and receive a person's head, longitudinal track means in said helmet, carriage means in said helmet movably supported on said track means, an arcuately curved transversely extending support bar movably mounted in said carriage means, means driving said support bar in the direction of its length through said carriage means, a hair cutter, means movably supporting said hair cutter on said support bar in a position spaced inwardly from the support bar, a feeler arm projecting from said hair cutter and being engageable with the person's head to establish the position of the hair cutter, and cooperating means on the carriage means and the hair cutter to vary the position of said feeler arm in accordance with the travel of the support bar transversely relative to said helmet.

2. An automatic hair cutting apparatus comprising a helmet shaped at fit longitudinally over and receive a person's head, longitudinally extending track means in said helmet, carriage means engaged with said track means and constrained to move therealong, endless belt means mounted on said helmet along said track means and connected to said carriage means, means to move said belt means in successive steps, an arcuately curved transversely extending support bar movably mounted in said carriage means, means driving said support bar in the direction of its length through said carriage means, a hair cutter, means movably supporting said hair cutter on said support bar in a position spaced inwardly from the support bar, a feeler arm projecting from said hair cutter and being engageable with a person's head to establish the position of the hair cutter, and cooperating means on the carriage means and the cutter housing to vary the position of said feeler arm in accordance with the travel of the support bar transversely relative to said helmet.

3. An automatic hair cutting apparatus comprising a helmet shaped to fit longitudinally over and receive a person's head, longitudinally extending guide means in said helmet, carriage means engaged with said guide means, means to move said carriage means along said guide means, a pair of parallel arcuately curved transversely extending support bars movably mounted on said carriage means, means driving said support bars in the direction of their lengths simultaneously in opposite directions, and respective inwardly extending hair cutters mounted on said support bars.

4. An automatic hair cutting apparatus comprising a helmet shaped to fit longitudinally over and receive a person's head, longitudinally extending guide means in said helmet, carriage means engaged with said guide means, means to move said carriage means along said guide means, a pair of parallel arcuately curved transversely extending support bars movably mounted in said carriage means, means driving said support bars simultaneously in the direction of their lengths in opposite directions, respective inwardly extending hair cutters mounted on said support bars, and cooperating means on the carriage means and the cutters to adjust the spacings of the hair cutters relative to the support bars in accordance with the travel of the support bars transversely relative to said guide means.

5. An automatic hair cutting apparatus comprising a helmet shaped to fit longitudinally over and receive a person's head, longitudinal track means in said helmet, carriage means in said helmet movably supported on said track means, a transversely extending arcuately-curved support bar movably mounted on said carriage means, means driving said support bar in the direction of its length relative to said carriage means, inwardly extending cutter means mounted on said support bar and moving therewith, cooperating means on the carriage means and the cutter means to adjust the spacing of the cutter means relative to the support bar in accordance with the travel of the support bar relative to the carriage means, and means to render said spacing adjusting means inoperative at predetermined locations in said helmet.

6. An automatic hair cutting apparatus comprising a helmet shaped to fit longitudinally over and receive a person's head, longitudinally extending guide means on said helmet, carriage means engaged with said guide means, means to move said carriage means along said guide means, a pair of parallel arcuately curved transversely extending support bars movably mounted in said carriage means, means driving said support bars simultaneously in the direction of their lengths in opposite directions, respective inwardly extending hair cutters mounted on said support bars, cooperating means on the carriage means and the cutters to adjust the spacings of the hair cutters relative to the support bars in accordance with the travel of the support bars transversely relative to said guide means, and cooperating means on the hair cutters and at predetermined locations in said helmet to render said spacing adjusting means inoperative.

7. An automatic hair cutting apparatus comprising a support member in the form of a helmet shaped to fit longitudinally over and to receive a person's head, longitudinally extending track means in said support member, carriage means supportingly engaged with said track means and constrained to move therealong, first reversible motor means, means to intermittently drivingly connect said motor means to said carriage means, whereby to move the carriage means along said track in steps, transversely extending arcuately-curved support bar means movably mounted in said carriage means, means on the carriage means constraining said support bar means to move lengthwise, second reversible motor means, drive means on said carriage means gearingly coupled to said support bar means, means connecting said second motor means to said drive means, and inwardly extending cutter means mounted on said support bar means and moving therewith.

8. An automatic hair cutting apparatus comprising a support member in the form of a helmet shaped to fit longitudinally over and to receive a person's head, longitudinally extending track means in said support member, carriage means supportingly engaged with said track means and constrained to move therealong, first reversible motor means, means to intermittently drivingly connect said motor means to said carriage means, whereby to move the carriage means along said track means in steps, a pair of parallel arcuately curved transversely extending support bars movably mounted in said carriage means, means on the carriage means constraining said support bars to move lengthwise, drive means in said carriage means gearingly coupled to said support bars to move them simultaneously in opposite directions, second reversible motor means, means connecting said second motor means to said drive means, and respective inwardly extending cutters mounted on the ends of the support bars and moving therewith.

9. An automatic hair cutting apparatus comprising a support member in the form of a helmet shaped to fit longitudinally over and to receive a person's head, longitudinally extending track means in said support member, carriage means supportingly engaged with said track means and constrained to move therealong, first reversible motor means, means to intermittently drivingly connect said motor means to said carriage means, whereby to move the carriage means along said track means in steps, a pair of parallel arcuately curved transversely extending support bars movably mounted in said carriage means, means on the carriage means constraining said support bars to move lengthwise, drive means in said carriage means gearingly coupled to said support bars to move them simultaneously in opposite directions, second reversible motor means, means connecting said second motor means to said drive means, respective inwardly extending cutters adjustably mounted on the ends of the support bars and moving therewith, and cooperating means on the carriage means and the cutters to progressively change the spacing of the cutters relative to the support bars responsive to the movement of the support bars in the carriage means.

10. An automatic hair cutting apparatus comprising a support member in the form of a helmet shaped to fit longitudinally over and to receive a person's head, frame means in the side portions of the support member including respective ear-receiving guard members, spaced yieldable spring-biased plunger elements mounted on and projecting inwardly from said frame means, flexible cable means connected to said plunger elements at the respective side portions of the support member, respective spools journaled at said side portions of the support member, means to wind up portions of the cable means on the spools, whereby to retract the plunger elements, means to yieldably retain the spools in predetermined positions, whereby to correspondingly limit the inward extension of the plunger elements, longitudinally extending track means in said support member, carriage means engaged with said track means and constrained to move therealong, first reversible motor means, means to intermittently drivingly connect said motor means to said carriage means, whereby to move the carriage means along said track means in steps, arcuately-curved transversely extending support bar means movably mounted in said carriage means, means on the carriage means constraining said support bar means to move lengthwise, second reversible motor means, drive means on said carriage means gearingly coupled to said support bar means, means connecting said second motor means to said drive means, and inwardly extending cutter means mounted on said support bar means and moving therewith.

11. An automatic hair cutting apparatus comprising a helmet shaped to fit longitudinally over and receive a person's head, longitudinal track means in said helmet, carriage means in said helmet movably supported on said track means, a curved transversely extending support bar movably mounted in said carriage means, means driving said support bar in the direction of its length through said through said carriage means, inwardly extending cutter means mounted on the support bar and moving therewith, cooperating means on the carriage means and cutter means adjusting the spacing of the cutter means relative to the support bar in accordance with the travel of the support bar in the direction of its length, said cutter means including a movable abutment element and means to render said spacing-adjusting means inoperative responsive to movement of said abutment element, and a projection in said helmet located to engage said abutment element at a predetermined position of the cutter means in the helmet.

12. An automatic hair cutting apparatus comprising a helmet shaped to fit longitudinally over and receive a person's head, longitudinal track means in said helmet, carriage means in said helmet movably supported on said track means, a curved transversely extending support bar movably mounted in said carriage means, means driving said support bar in the direction of its length through said carriage means, inwardly extending cutter means mounted on the support bar and moving therewith, cooperating means on the carriage means and cutter means adjusting the spacing of the cutter means relative to the support bar in accordance with the travel of the support bar in the direction of its length, said cutter means including a movable abutment element and means to render said spacing-adjusting means inoperative responsive to movement of said abutment element relative to the cutter means, a projection in said helmet engageable with said abutment element, and means to at times change the position of said projection relative to said helmet.

13. An automatic hair cutting apparatus comprising a helmet shaped to fit longitudinally over and receive a person's head, longitudinal track means in said helmet, carriage means in said helmet movably supported on said track means, a curved transversely extending support bar movably mounted in said carriage means, means driving said support bar in the direction of its length through said carriage means, inwardly extending cutter means mounted on the support bar and moving therewith, a feeler arm movably mounted in the cutter means and engageable with the person's head to control the spacing of the cutter means from the person's head, cooperative means on the carriage means and the cutter means to move the feeler arm lengthwise in accordance with the travel of the support bar in the direction of its length, said cutter means including a movable abutment element and means to render said feeler arm-moving means inoperative responsive to movement of said abutment element relative to the cutter means, and a projection in said helmet engageable with said abutment element.

References Cited by the Examiner
UNITED STATES PATENTS 2,915,070 12/1959 Benson _____ 132—45
2,972,351 2/1961 Morgan _____ 132—45

RICHARD A. GAUDET, *Primary Examiner.*